(12) United States Patent
Bergkoetter et al.

(10) Patent No.: US 9,126,496 B2
(45) Date of Patent: Sep. 8, 2015

(54) CONTROL METHOD TO BIAS HYBRID BATTERY STATE-OF-CHARGE TO IMPROVE AUTOSTOP AVAILABILITY FOR LIGHT-ELECTRIFICATION VEHICLES

(71) Applicant: GM GLOBAL TECHNOLOGY OPERATIONS LLC, Detroit, MI (US)

(72) Inventors: Brenton J. Bergkoetter, Milford, MI (US); William L. Aldrich, III, Davisburg, MI (US); Brian L. Spohn, Holly, MI (US); Todd Michael York, Highland, MI (US); Andrew Meintz, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 135 days.

(21) Appl. No.: 13/927,727

(22) Filed: Jun. 26, 2013

(65) Prior Publication Data
US 2015/0005996 A1    Jan. 1, 2015

(51) Int. Cl.
*B60L 11/00*    (2006.01)
*B60L 11/18*    (2006.01)

(52) U.S. Cl.
CPC .......... *B60L 11/1861* (2013.01); *Y10S 903/903* (2013.01)

(58) Field of Classification Search
USPC .......... 701/22, 36; 180/65.28, 65.29, 65.265, 180/65.275; 307/9.1, 10.1, 10.7; 903/903, 903/907
See application file for complete search history.

(56) References Cited

U.S. PATENT DOCUMENTS

| | | | |
|---|---|---|---|
| 6,992,533 B2* | 1/2006 | Hollinger et al. | 331/143 |
| 2002/0157882 A1* | 10/2002 | Kubo et al. | 180/65.3 |
| 2004/0217736 A1* | 11/2004 | Bischoff | 320/119 |
| 2009/0146615 A1* | 6/2009 | Zillmer et al. | 322/23 |
| 2010/0071975 A1* | 3/2010 | Aoki | 180/65.285 |
| 2012/0130577 A1* | 5/2012 | Ichimoto | 701/22 |
| 2012/0208672 A1* | 8/2012 | Sujan et al. | 477/5 |
| 2014/0001844 A1* | 1/2014 | Krieg | 307/10.7 |
| 2014/0156132 A1* | 6/2014 | Ichimoto | 701/22 |

* cited by examiner

*Primary Examiner* — Yonel Beaulieu

(57) ABSTRACT

Method for adjusting a state-of-charge within an electrical energy storage device of a hybrid powertrain system includes monitoring a plurality of electrical energy storage device parameters and determining a discharge power capability of the electrical energy storage device based on the monitored plurality of electrical energy storage device parameters. If the discharge capability is less than a first threshold, a state-of-charge adjustment mode is activated. The state-of-charge adjustment mode includes increasing a commanded state-of-charge to an elevated state-of-charge to increase the discharge capability to achieve the first threshold and maintaining the commanded state-of-charge at the elevated state-of-charge until the discharge capability achieves the first threshold.

19 Claims, 3 Drawing Sheets

CONTROL METHOD TO BIAS HYBRID BATTERY STATE-OF-CHARGE TO IMPROVE AUTOSTOP AVAILABILITY FOR LIGHT-ELECTRIFICATION VEHICLES

TECHNICAL FIELD

This disclosure is related to managing state-of-charge in an electrical energy storage device of a hybrid powertrain.

BACKGROUND

The statements in this section merely provide background information related to the present disclosure. Accordingly, such statements are not intended to constitute an admission of prior art.

Powertrain systems of vehicles may employ engine autostopping strategies to shutdown an engine when a vehicle is stopped. For instance, when a vehicle is stopped at a traffic light and an operator of the vehicle has a brake pedal depressed, a fuel cut-off event can be performed where the engine is automatically stopped and shut down. These autostopping strategies improve fuel economy due to the engine not operating fueled to maintain an idle speed while stopped. When vehicle motion is desired, the engine can be automatically started to provide motive torque to the drive wheels.

It is known, to utilize an electric starter motor to crank an engine of a powertrain system during engine start events. Electrical energy is required from an energy storage device, e.g., battery, to supply the starter motor for cranking the engine. The battery's discharge power capability can be estimated to determine if the battery is available for performing an autostart event. The battery's discharge capability can become too low for performing autostart events when the battery is cold or when high internal resistance exists due to aging. As such, control systems of the powertrain system may not permit autostart events when the battery discharge power capability is too low.

SUMMARY

Method for adjusting a state-of-charge within an electrical energy storage device of a hybrid powertrain system includes monitoring a plurality of electrical energy storage device parameters and determining a discharge power capability of the electrical energy storage device based on the monitored plurality of electrical energy storage device parameters. If the discharge capability is less than a first threshold, a state-of charge adjustment mode is activated. The state-of-charge adjustment mode includes increasing a commanded state-of-charge to an elevated state-of-charge to increase the discharge capability to achieve the first threshold and maintaining the commanded state-of-charge at the elevated state-of-charge until the discharge capability achieves the first threshold.

BRIEF DESCRIPTION OF THE DRAWINGS

One or more embodiments will now be described, by way of example, with reference to the accompanying drawings, in which.

DETAILED DESCRIPTION

Figure 1:
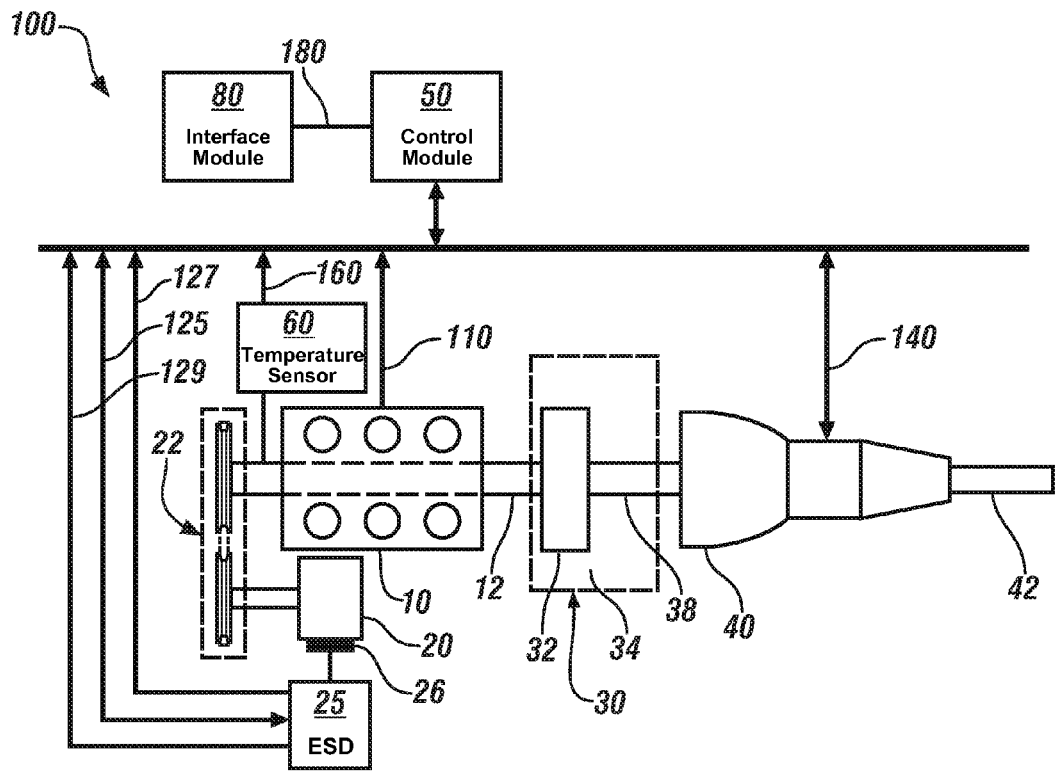
FIG. 1 illustrates a hybrid powertrain system including an internal combustion engine, a torque transfer device, a torque machine, and a transmission device configured to transfer torque to a driveline in accordance with the present disclosure.

Referring now to the drawings, wherein the showings are for the purpose of illustrating certain exemplary embodiments only and not for the purpose of limiting the same, FIG. 1 illustrates a hybrid powertrain system 100 of a vehicle including an internal combustion engine 10, an electric machine 20, and a transmission device 40 configured to transfer torque to a driveline 42 including one or more drive wheels. The electric machine 20 can be a multi-phase electric motor/generator device that electrically connects to a high-voltage energy storage device (ESD) 25 via an electric power inverter 26.

Engine 10 includes a crankshaft 12 that extends beyond each end of the engine 10. The first end of the crankshaft 12 rotatably couples to a mechanical coupler 22, which rotatably couples to the electric machine 20. The mechanical coupler 22 transfers torque between the engine 10 and the electric machine 20, and may include belts, pulleys and idlers, or alternatively may include meshingly engaged gear elements. Specific engine operating conditions of concern include operating the electric machine 20 to spin and crank the engine 10 during key-on engine starting events and engine restarting events during ongoing powertrain operation. The illustrative hybrid powertrain system 100 is arranged in a belt-alternator-starter (BAS) configuration. The second end of the crankshaft 12 rotatably couples to a torque converter 30 that rotatably couples to a transmission input member 38 of the transmission 40. The torque converter 30 may be any suitable torque converter device and preferably includes an impeller 32 and corresponding turbine 34. The torque converter 30 may include a controllable torque converter clutch that locks rotations of the impeller 32 and the turbine 34.

The transmission 40 includes a plurality of meshingly engaged gear elements selectively operative between a plurality of fixed gear ratios through activation of one or more torque-transfer devices. In an exemplary embodiment, the one or more torque-transfer devices are hydraulic clutch devices.

A control module 50 monitors ambient temperature via signal 160 (hereinafter "ambient temperature 160"), an ESD temperature via signal 127 (hereinafter "ESD temperature 127"), an engine temperature via signal 110 (hereinafter "engine temperature 110"), and a transmission temperature via signal 140 (hereinafter "transmission temperature 140"). It will be appreciated that this disclosure is not limited to any one technique for obtaining the ambient, ESD, engine and transmission temperatures 160, 127, 110, 140, respectively. For instance, the ambient temperature 160 can be obtained from a temperature sensor 60 located proximate to the powertrain 100. The ESD temperature 127 refers to an internal temperature of the ESD 25 based on measured and/or calculated temperatures of a plurality of cells within the ESD 25. In an exemplary embodiment, the monitored engine temperature 110 can be based upon measuring coolant temperature of the engine 10 as a function of the ambient temperature 160. Alternatively, the monitored engine temperature 110 can be based upon measuring a surface temperature of the engine 10. The monitored transmission temperature 140 can be based upon measuring a transmission fluid temperature within the transmission 40 as a function of the ambient temperature 160. The control module 50 can further monitor an operator input 180 from an interface module 80. The operator input 180 can include an operator torque request in response to an operator input to a brake or accelerator pedal. The operator input 180 can further include a selected gear state of the transmission 40 based on a user input to PRNDL lever.

The control module 50 further monitors a state-of-charge (hereinafter "ESD SOC 125") and an internal resistance (hereinafter "ESD internal resistance 129") of the ESD 25 via signals 125, 129, respectively. The ESD SOC 125, the ESD temperature 127, and the ESD internal resistance 129 can be referred to as ESD parameters. The ESD SOC 125 can be obtained from a look-up table based upon the ESD temperature 127, voltage and current through the ESD 25. Based upon a function of the ESD SOC 125 and the ESD temperature 127, the control module 50 can estimate an instantaneous discharge power capability of the ESD 25 (hereinafter "$ESD_{Pwr\_Cap}$"). The $ESD_{Pwr\_Cap}$ can further be estimated based on the ESD internal resistance 129, in addition to the ESD SOC 125 and the ESD temperature 127. The ESD internal resistance 129 can be based upon voltage change of the ESD 25 as a result of a current being discharged from the ESD 25. The ESD internal resistance 129 is indicative of the ESD's age, wherein the ESD internal resistance 129 will increase as the ESD 25 ages. Generally, lower internal resistances are indicative of higher $ESD_{Pwr\_Cap}$ values than higher internal resistances at the same ESD SOC 125.

The engine 10 is capable of performing autostop and autostart events during a drive cycle. For instance, the engine 10 can be stopped and unfueled (i.e., a fuel cut-off event) when the vehicle is stopped and the operator has the brake pedal depressed. Similarly, the engine 10 may be stopped and unfueled when the vehicle is traveling on a downgrade that exceeds a threshold. When conditions become present requiring the engine to be running and fueled, the autostart event can be performed to start the engine 10. For instance, the autostart event can occur once an operator releases a brake pedal when the vehicle is stopped. It will be appreciated that the autostart event is not limited to any specific type of autostart event, and can include non-driver induced autostart events that are not a result of the operator input 180. The engine 10 is started by receiving torque from the electric machine 20 via the coupler device 22 to spin the crankshaft 12 of the engine 10.

Exemplary embodiments are directed toward managing the $ESD_{Pwr\_Cap}$ at or above a capability threshold. As used herein, the term "capability threshold" refers to a minimum discharge power from the ESD 20 required for performing an autostart event. The capability threshold can be a predetermined magnitude of discharge power based on constraints of the ESD 25 and the engine 10. Accordingly, when the $ESD_{Pwr\_Cap}$ is at least the capability threshold, the ESD 25 is otherwise available for performing the autostart event, and thus, capable of powering the electric machine 20 for providing torque to start the engine 10. In other words, autostops (e.g., fuel cut-off events) will be allowed when the $ESD_{Pwr\_Cap}$ is at least the capability threshold since the ESD 25 may subsequently perform the autostart event. As will become apparent, the ESD SOC 125 can be adjusted to manage the $ESD_{Pwr\_Cap}$ to at least the capability threshold required for performing autostarts of the engine 10.

Figure 2:
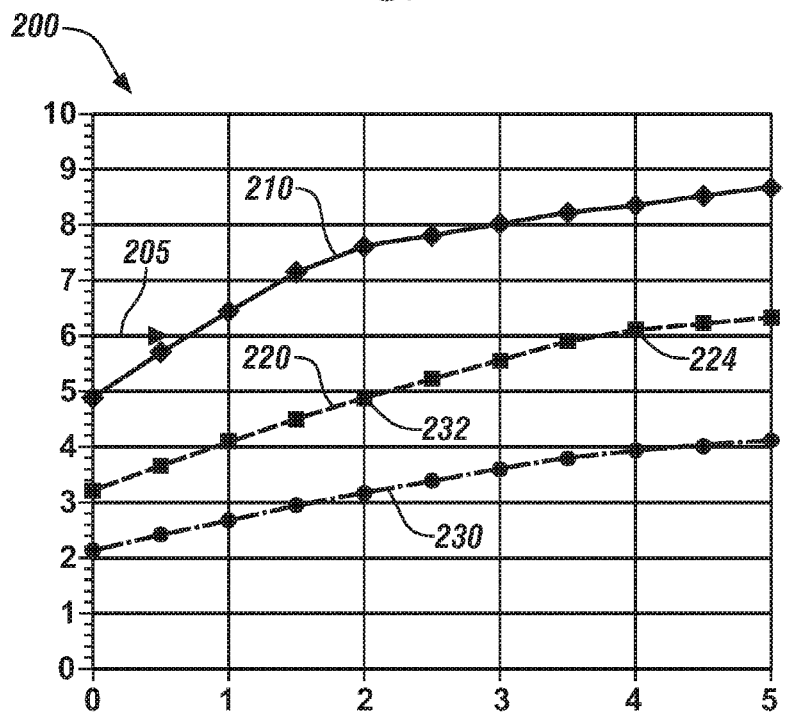
FIG. 2 illustrates an exemplary non-limiting plot of energy storage device state-of-charge versus energy storage device discharge power capability for a plurality of energy storage device temperatures, in accordance with the present disclosure.

FIG. 2 illustrates an exemplary non-limiting plot 200 of energy storage device state-of-charge versus energy storage device discharge power capability for a plurality of energy storage device temperatures, in accordance with the present disclosure. In the illustrated embodiment, the ESD corresponds to the ESD 25 of FIG. 1 at a beginning-of-life (BOL), i.e. having a battery internal resistance consistent with a beginning-of-life battery. The horizontal axis denotes state-of-charge (%) and the vertical axis denotes power (kilowatts). The horizontal axis represents normalized state-of-charge (%) values from 0 to 5, wherein a low ESD SOC is at "1", a baseline ESD SOC is at "2.0", and an elevated ESD SOC is at "4". The state-of-charge along the horizontal axis and the power along the vertical axis each increase from the origin. Profile line 210 depicts the ESD SOC versus the $ESD_{Pwr\_Cap}$ at an ESD temperature of 20° C. Profile line 220 depicts the ESD SOC versus the $ESD_{Pwr\_Cap}$ at an ESD temperature of 0° C. Profile line 230 depicts the ESD SOC versus the $ESD_{Pwr\_Cap}$ at an ESD temperature of −10° C. Line 205 depicts a capability threshold (hereinafter "capability threshold 205"). Each of profile lines 210, 220, and 230 illustrate that the $ESD_{Pwr\_Cap}$ increases as the ESD SOC increases.

Furthermore, warmer ESD temperatures are indicative of achieving a higher $ESD_{Pwr\_Cap}$ value for a given ESD SOC. For instance, at the low ESD SOC, profile line 210 at the ESD temperature of 20° C. corresponds to a $ESD_{Pwr\_Cap}$ value that is greater than the $ESD_{Pwr\_Cap}$ value at each of the profile lines 220 and 230 at the ESD temperatures of 20° C. and −10° C., respectively. Profile line 220 at the ESD temperature of 20° C. has a $ESD_{Pwr\_Cap}$ value that is greater than the $ESD_{Pwr\_Cap}$ value at profile line 230 at the ESD temperature of −10° C. —Thus, only profile line 210 at the ESD temperature of 20° C. is greater than the capability threshold 205 when the ESD SOC is at the low ESD SOC.

Referring to profile line 220 at an ESD temperature of 0° C., it is appreciated that an autostart event of the engine 10 of FIG. 1 would be indicative of a cold autostart event. At point 232, the ESD SOC is at the baseline ESD SOC. Accordingly, the $ESD_{Pwr\_Cap}$ is below the capability threshold 205, and thus, the ESD 25 is not available for performing an autostart event of the engine 10. However, adjusting (e.g., increasing) the ESD SOC can be carried out to increase the $ESD_{Pwr\_Cap}$ to a magnitude that is at least the capability threshold. For instance, at point 224, increasing the ESD SOC to the elevated ESD SOC, increases the $ESD_{Pwr\_Cap}$ from the value below the capability threshold 205 at point 232 to a value greater than the capability threshold 205 at point 224. Accordingly, the $ESD_{Pwr\_Cap}$ is at least the capability threshold 205 at point 224, rendering the ESD 25 available for providing power to the electric machine 20 for starting the engine 10 during an autostart event.

Figure 3:
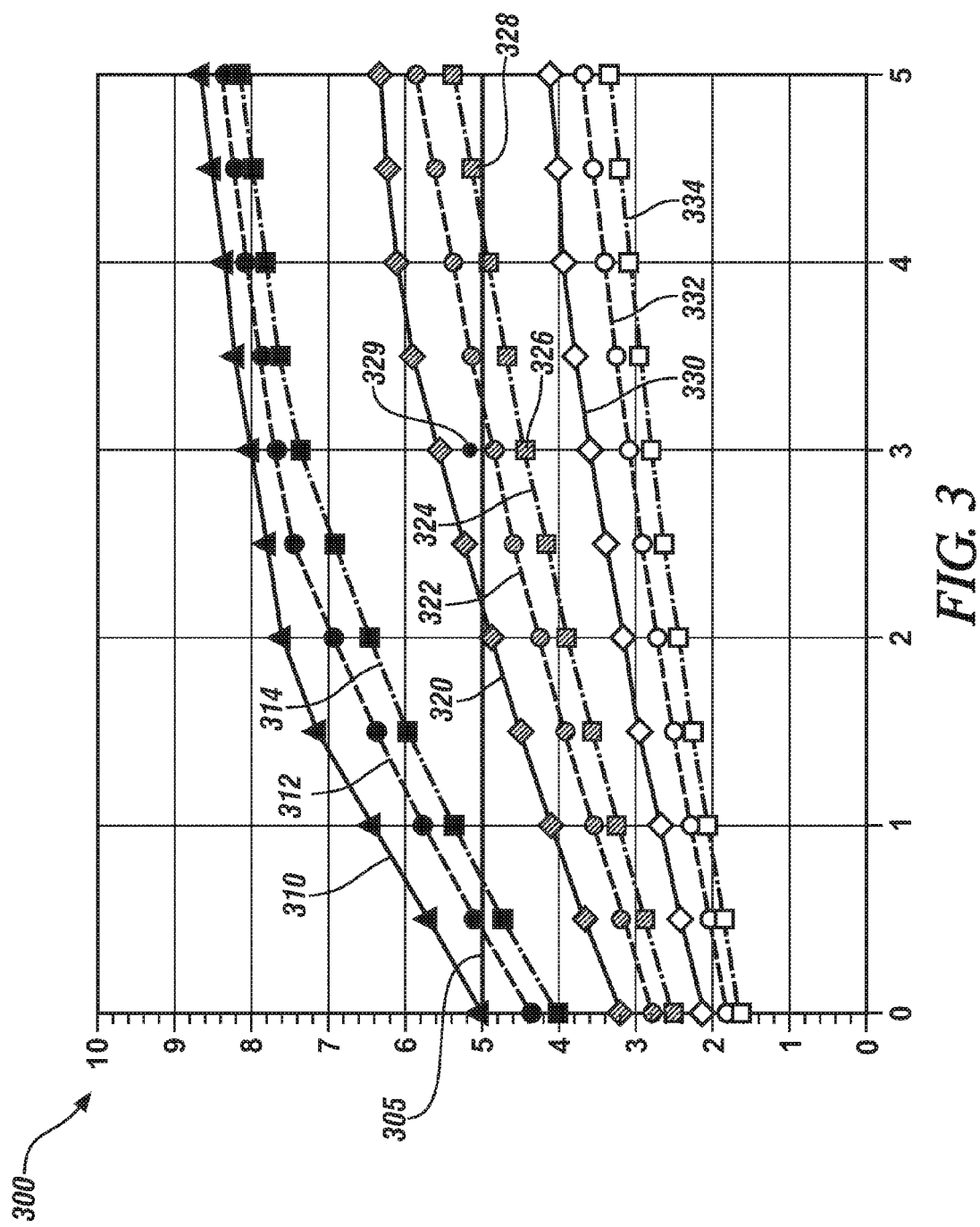
FIG. 3 illustrates an exemplary non-limiting plot of energy storage device state-of-charge versus energy storage device discharge power capability for a plurality of energy storage device temperatures and a plurality of energy storage device internal resistance percentages, in accordance with the present disclosure.

FIG. 3 illustrates an exemplary non-limiting plot 300 of energy storage device state-of charge versus energy storage device discharge power capability for a plurality of energy storage device temperatures and a plurality of energy storage device internal resistance percentages, in accordance with the present disclosure. The horizontal axis denotes state-of-charge (%) and the vertical axis denotes power (kilowatts).

The horizontal axis represents normalized state-of-charge (%) values from 0 to 5, wherein a reduced ESD SOC is at "1", a baseline ESD SOC is at "3.0", and an increased ESD SOC is at "4.5". The state-of-charge along the horizontal axis and the power along the vertical axis each increase from the origin. Line 305 depicts a capability threshold (hereinafter "capability threshold 305"). Profile lines 310, 312, 314 depict the ESD SOC versus the $ESD_{Pwr\_Cap}$ at an ESD temperature of 20° C. Profile lines 320, 322, 324 depict the ESD SOC versus the $ESD_{Pwr\_Cap}$ at an ESD temperature of 0° C. Profile lines 330, 332, 334 depict the ESD SOC versus the $ESD_{Pwr\_Cap}$ at an ESD temperature of −10° C. In the non-limiting plot of 300, it is appreciated that the $ESD_{Pwr\_Cap}$ values increase as the ESD SOC values increase and warmer ESD temperatures are indicative of achieving higher $ESD_{Pwr\_Cap}$ values for a given ESD SOC.

In the illustrated embodiment, the internal resistance is expressed as a percentage after the BOL of the ESD 25 of FIG. 1. For instance, each of profile lines 310, 320, 330 illustrate an internal resistance that is indicative of an un-aged ESD 25 at the BOL. Similarly, each of profile lines 312, 322, 332 illustrate an internal resistance that is indicative of the ESD 25 aged a first percentage after the BOL. Likewise, each of profile lines 314, 324, 334 illustrate an internal resistance that is indicative of the ESD 25 aged a second percentage after the BOL, wherein the second percentage after the BOL includes an internal resistance that is increased from the first percentage after the BOL. As illustrated in the non-limiting plot of 300, it is appreciated that the $ESD_{Pwr\_Cap}$ values increase for lower internal resistance percentages at the same ESD SOC 125 and the same ESD temperature. In other words, the more aged the ESD 25 becomes, the lower the $ESD_{Pwr\_Cap}$ will be at a given ESD SOC 125 and ESD temperature 127.

Referring to profile line 324 at an ESD temperature of 20° C. and an internal resistance the second percentage after BOL, the ESD SOC corresponds to the reduced ESD SOC. Accordingly, the $ESD_{Pwr\_Cap}$ having a value that is below the capability threshold 305 at point 326, and thus, the ESD 25 is not available for performing an autostart event of the engine 10 at point 326. However, adjusting (e.g., increasing) the ESD SOC can be carried out to increase the $ESD_{Pwr\_Cap}$ to a magnitude that is at least the capability threshold. For instance, at point 328, increasing the ESD SOC to the increased ESD SOC, increases the $ESD_{Pwr\_Cap}$ from the value that is below the capability threshold 305 at point 326 to a value that is greater than the capability threshold 305 at point 328. Accordingly, the $ESD_{Pwr\_Cap}$ is at least the capability threshold 305 at point 328, rendering the ESD 25 available for providing power to the electric machine 20 for starting the engine 10 during an autostart event. Furthermore, the $ESD_{Pwr\_Cap}$ is increased when the resistance is changed from the second percentage at point 326 to a third percentage that is reduced 50% from the second percentage at point 329. Thus, increasing the ESD SOC from the reduced ESD SOC to the increased ESD SOC, as shown from points 326 to 328, has the same impact on increasing the $ESD_{Pwr\_Cap}$ as reducing the age effect due to internal resistance of the ESD by 50%, as shown from points 326 to 329.

Figure 4:
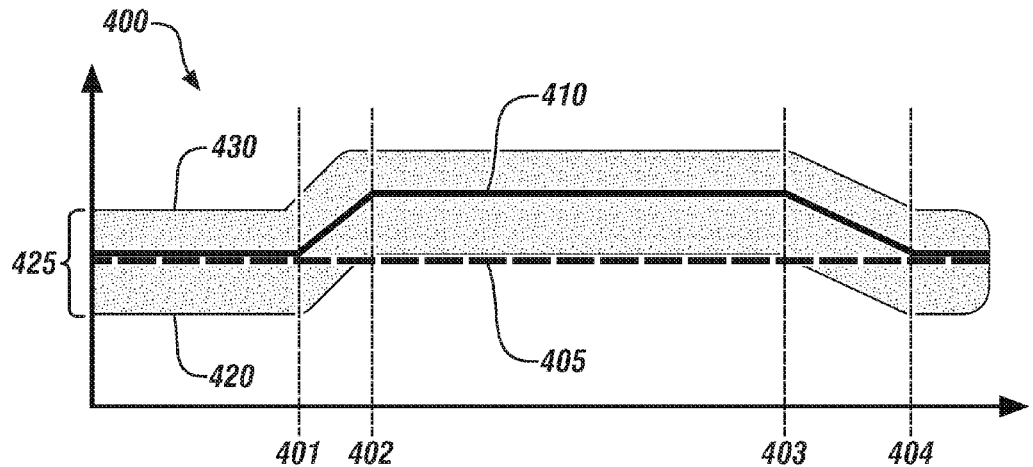
FIG. 4 illustrates an exemplary plot of transitioning from a desired state-of-charge to an elevated state-of-charge to increase a discharge power capability of an energy storage device of FIG. 1, in accordance with the present disclosure.

Each of the non-limiting plots of FIGS. 2 and 3 demonstrate that the ESD SOC 125 can be adjusted to increase the $ESD_{Pwr\_Cap}$ when the $ESD_{Pwr\_Cap}$ is less than the capability threshold. FIG. 4 illustrates an exemplary plot 400 of transitioning from a desired state-of-charge to a target state-of-charge to increase a discharge power capability of the energy storage device 25 of FIG. 1, in accordance with the present disclosure. The horizontal axis denotes time (seconds) and the vertical axis denotes ESD SOC (%). It will be appreciated that all values for time are non-limiting, and provided for example only. Horizontal dashed line 405 denotes a desired SOC (e.g., desired SOC 405) of the ESD 25 of FIG. 1. The term "desired SOC" can refer to an ESD SOC value that is to be maintained under normal operating conditions of the powertrain system 100 when it is not desirable to increase the discharge power capability of the ESD 25 (e.g., $ESD_{Pwr\_Cap}$) to be at least the capability threshold. Profile line 410 denotes a commanded SOC (e.g., commanded SOC 410) of the ESD 25 of FIG. 1. The term "commanded SOC" can refer to a SOC that is commanded such that the $ESD_{Pwr\_Cap}$ is at least the capability threshold for allowing an engine autostart event. As illustrated in plot 400, the commanded SOC 410 is equal to the desired SOC 405 until a SOC adjustment mode is initiated at dashed vertical line 401. Similarly, the commanded SOC 410 is again equal to the desired SOC 405 at and beyond dashed vertical line 404 after the SOC adjustment mode is terminated and deactivated at dashed vertical line 403.

Plot 400 further includes a commanded SOC operating window 425 defined by a maximum commanded SOC limit 430 and a minimum commanded SOC limit 420. ESD SOC values within the SOC operating window 425 include acceptable commanded SOC values during operation of the hybrid powertrain system 100. For instance, the commanded SOC 410 may be biased toward the maximum commanded SOC limit 430 when the vehicle is travelling on a downward slope to maximize regeneration within the ESD 25. In contrast, the commanded SOC 410 may be biased toward the minimum commanded SOC limit 420 when the vehicle is accelerating to maximize motor torque availability with power supplied from the ESD 25.

The control module 50 of FIG. 1 optimizes the hybrid powertrain system 100 such that the ESD SOC 125 is maintained at the desired SOC when it is not desirable to increase the $ESD_{Pwr\_Cap}$ to be at least the capability threshold. When the $ESD_{Pwr\_Cap}$ is less than the capability threshold and activation conditions exist, the control module 50 can initiate the SOC adjustment mode whereat the commanded SOC 410 is adjusted to affect an increase in the $ESD_{Pwr\_Cap}$ to achieve the capability threshold. In the non-limiting plot 400 of FIG. 4, the SOC adjustment mode is initiated at dashed vertical line 401 whereat the commanded SOC 410 is increased from the desired SOC to an elevated SOC at dashed vertical line 402, wherein the elevated SOC is greater than the desired SOC. In the illustrated embodiment, the elevated SOC is equal to the elevated ESD SOC at "4" along the horizontal axis of FIG. 2. The term "elevated SOC" can refer to a predetermined SOC value selected to result in the $ESD_{Pwr\_Cap}$ achieving a desired value at or above the capability threshold as a function of the ESD temperature 127 and the ESD internal resistance 129.

Exemplary embodiments are directed toward initiating the SOC adjustment mode when both the $ESD_{Pwr\_Cap}$ is less than the capability threshold and the activation conditions exist for a first predetermined period of time. In a non-limiting embodiment, the first predetermined period of time is equal to 5.0 seconds. The activation conditions may exist when the instantaneous ESD SOC 125 is not greater than a maximum SOC limit of the ESD, no high voltage faults in the powertrain exist, ambient temperature is greater than an ambient temperature threshold, the ESD temperature 127 is greater than an ESD temperature threshold, the engine temperature 110 is greater than an engine temperature threshold, and the transmission temperature 140 is greater than a transmission temperature threshold. As used herein, the term "maximum SOC limit" refers to a maximum ESD SOC 25 allowed by the ESD 25.

The SOC adjustment mode is initiated at dashed vertical line 401 and remains enabled between dashed vertical lines 402 and 403, wherein the commanded SOC is maintained at the elevated SOC. Accordingly, when the commanded SOC is selected to be equal to the elevated SOC, the control module 50 optimizes the powertrain system 100 to select operating points indicative of higher engine torques and lower electric machine torques such that the ESD SOC 125 can be increased to affect an increase in the $ESD_{Pwr\_Cap}$ to achieve the capability threshold. The selection of the operating points, including higher engine torques and lower electric machine torques when the SOC adjustment mode is enabled, allows for the electric machine 20 to generate electric energy for storage in the ESD 25 such that the ESD SOC 125 is increased to achieve the commanded SOC that is equal to the elevated SOC. It will be appreciated that the ESD temperature 127 is increasing between dashed vertical lines 402 and 403.

At dashed vertical line 403, the SOC adjustment mode is deactivated, and the commanded ESD is reduced or decreased to the desired ESD. Exemplary embodiments are directed toward deactivating the SOC adjustment mode when the $ESD_{Pwr\_Cap}$ is at least the capability threshold for a second predetermined period of time. In a non-limiting embodiment, the second predetermined period of time is equal to 6.0 seconds. Thus, when the SOC adjustment mode is deactivated, the commanded SOC transitions from the elevated SOC at dashed vertical line 403 to the desired SOC at dashed vertical line 404. Due to the ESD temperature 127 increasing, the $ESD_{Pwr\_Cap}$ can be maintained at or above the capability threshold while the commanded SOC is reduced from the elevated SOC to the desired SOC between dashed vertical lines 3 and 4. For instance, the commanded SOC can be reduced between dashed vertical lines 3 and 4 at a predetermined rate based on a function of a rate at which the ESD temperature 127 is increasing such that the $ESD_{Pwr\_Cap}$ is maintained at or above the capability threshold. As aforementioned, warmer ESD temperatures are indicative of higher $ESD_{Pwr\_Cap}$ values than cooler ESD temperatures at the same ESD SOC 125.

In some embodiments, when the $ESD_{Pwr\_Cap}$ is less than an energy absorbing threshold, at dashed vertical line 401 for instance, the commanded SOC can first be decreased from the desired SOC to maximize an ability to absorb electrical energy within the ESD 25. The energy absorbing threshold includes a magnitude of discharge power capability less than the capability threshold. As used herein, the term "energy absorbing threshold" refers to a minimum discharge power capability permitted before ESD SOC needs to first be decreased in order to maximize an ability to absorb electrical energy within the ESD 25. It will be understood that the ESD 25 absorbs electrical energy at a quicker rate when the ESD temperature 127 cooler. As a result, the ability of the ESD 25 to absorb electrical energy becomes less the higher the ESD SOC 125 is due to power approaching a power limit. Accordingly, decreasing the ESD SOC 125 lowers the power from the power limit such that the ability of the ESD 25 to absorb electrical energy is maximized. Once the discharge power capability becomes greater than the energy absorbing threshold, or some magnitude greater than the energy absorbing threshold but still less than the capability threshold, the commanded SOC can be increased to the elevated SOC as illustrated between dashed vertical lines 1 and 2 of the non-limiting plot 400 of FIG. 4.

Figure 5:
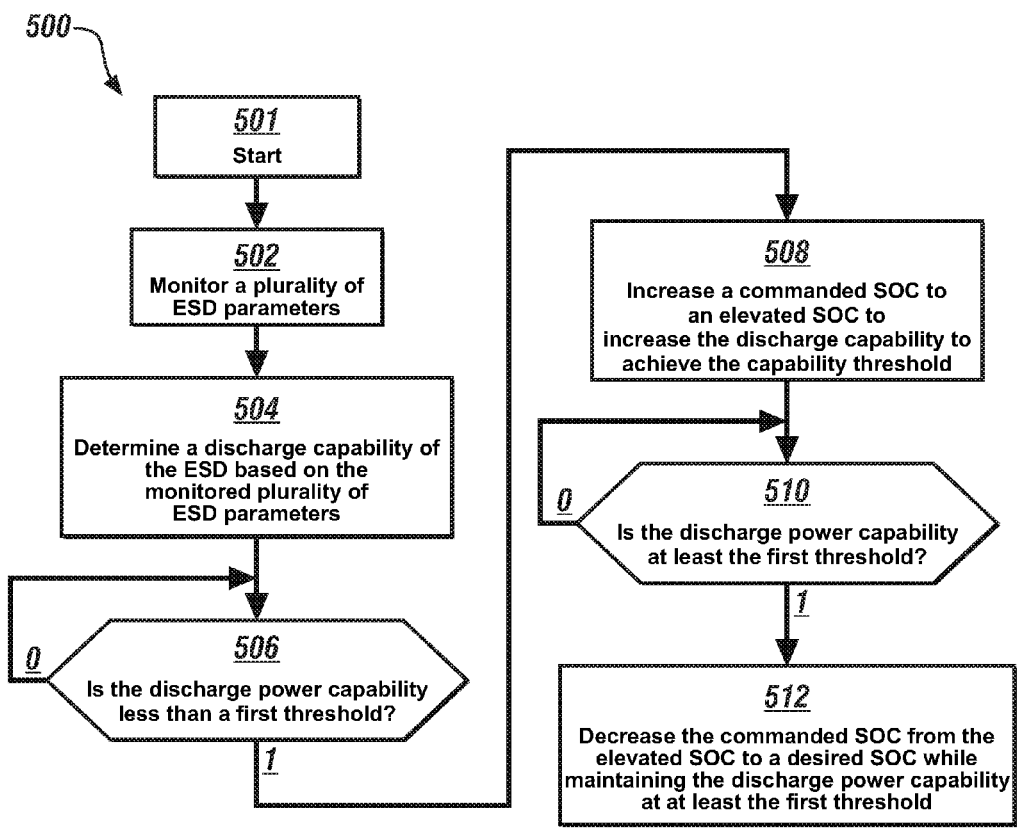
FIG. 5 illustrates an exemplary flowchart for adjusting a state-of-charge of the electrical energy storage device of FIG. 1 to improve an autostop availability, in accordance with the present disclosure.

FIG. 5 illustrates an exemplary flowchart 500 for adjusting a state-of-charge (SOC) within the ESD of FIG. 1 to improve an autostop availability, in accordance with the present disclosure. It will be appreciated that the exemplary flowchart 500 can be implemented within the control module 50 illustrated in FIG. 1. The flowchart 500 can be described with reference to the hybrid powertrain system 100 of FIG. 1 and the non-limiting exemplary plot 400 of FIG. 4. It will be appreciated that all values for time are non-limiting, and provided for example only. Table 1 is provided as a key to FIG. 5 wherein the numerically labeled blocks and the corresponding functions are set forth as follows:

TABLE 1

| BLOCK | BLOCK CONTENTS |
|---|---|
| 501 | Start. |
| 502 | Monitor a plurality of ESD parameters. |
| 504 | Determine a discharge capability of the ESD based on the monitored plurality of ESD parameters. |
| 506 | Is the discharge power capability less than a first threshold? |
| 508 | Increase a commanded SOC to an elevated SOC to increase the discharge capability to achieve the capability threshold. |
| 510 | Is the discharge power capability at least the first threshold? |
| 512 | Decrease the commanded SOC from the elevated SOC to a desired SOC while maintaining the discharge power capability at at least the first threshold. |

The flowchart 500 starts at block 501 and proceeds to block 502 wherein a plurality of ESD parameters are monitored. The ESD parameters can include the ESD SOC 125, the ESD temperature 127 and the ESD internal resistance 129. Block 502 may additionally monitor the ambient temperature 160, the engine temperature 110 and the transmission temperature 140. The flowchart proceeds to block 504 where the discharge power capability ($ESD_{Pwr\_Cap}$) of the ESD 25 is determined based on the monitored ESD parameters. The $ESD_{Pwr\_Cap}$ is instantaneous and can be estimated based on the monitored SOC of the ESD (i.e., ESD SOC 125) as a function of the ESD temperature 127 and the ESD internal resistance 129. Once the instantaneous $ESD_{Pwr\_Cap}$ is determined/estimated, the flowchart 500 proceeds to decision block 506.

At decision block 506, it is determined if the $ESD_{Pwr\_Cap}$ is at least the first threshold. If the condition is satisfied as denoted by a "1", i.e., $ESD_{Pwr\_Cap}$ is at least the first threshold, the flowchart proceeds to block 508 where an SOC adjustment mode is activated. If the condition is not satisfied as denoted by a "0", the flowchart 500 reverts back to decision block 506. The first threshold includes a capability threshold that defines a minimum discharge power from the ESD 25 required for performing an autostart event of the engine 10. In one embodiment, decision block 506 can determine if both the $ESD_{Pwr\_Cap}$ is at least the first threshold and activation conditions exist for a first predetermined period of time. In a non-limiting embodiment, the first predetermined period of time is 5 seconds. If the latter embodiment is satisfied as denoted by a "1", the flowchart 500 proceeds to block 508 where the SOC adjustment mode is activated. If the latter embodiment is not satisfied as denoted by a "0", the flowchart 500 reverts back to block 506.

In one embodiment, the activation conditions of decision block 506 may exist when the instantaneous ESD SOC 125 is not greater than a maximum SOC limit of the ESD, no high voltage faults in the powertrain exist, ambient temperature 160 is greater than an ambient temperature threshold, the ESD temperature 127 is greater than an ESD temperature threshold, the engine temperature 110 is greater than an engine temperature threshold, and the transmission temperature 140 is greater than a transmission temperature threshold. In an alternative embodiment, the activation conditions may exist when ESD 25 power limits are not indicative of allowing an autostart of the engine 10, the engine temperature 110 is less than an engine temperature threshold by a magnitude that does not exceed a disallowable threshold, the ESD temperature 127 is greater than the ESD temperature threshold, the elevated SOC is not greater than the maximum SOC limit of the ESD 25, no voltage vaults in the powertrain system 100 exist, ambient temperature 160 is greater than the ambient temperature threshold and the transmission temperature 140 is greater than the transmission temperature threshold.

The SOC adjustment mode is activated at block 508 and a commanded SOC is increased to an elevated SOC to increase the $ESD_{Pwr\_Cap}$ to achieve the first threshold. Specifically, the commanded SOC is increased from the desired SOC (e.g., horizontal dashed line 405 of FIG. 4) to the elevated SOC (e.g., SOC between dashed vertical lines 402 and 403 of FIG. 4). The elevated SOC is selected to produce an increased $ESD_{Pwr\_Cap}$ that is at least the first threshold. For instance, the elevated SOC can be selected to produce the increased $ESD_{Pwr\_Cap}$ based on a function of the ESD temperature 127, wherein warmer ESD temperatures are indicative of achieving higher or increased $ESD_{Pwr\_Cap}$ values at a given ESD SOC 125. In another embodiment, the elevated SOC can be selected to produce the increased $ESD_{Pwr\_Cap}$ based on a function of the ESD temperature 127 and the ESD internal temperature 129, wherein lower ESD internal resistances are indicative of achieving higher or increased $ESD_{Pwr\_Cap}$ values at a given ESD SOC 125 and ESD temperature 127. The commanded SOC is maintained at the elevated SOC and proceeds to decision block 510.

Decision block 510 determines if the $ESD_{Pwr\_Cap}$ is at least the first threshold. If the $ESD_{Pwr\_Cap}$ is not at least the first threshold as denoted by a "0", the commanded SOC remains maintained at the elevated SOC and the flowchart 500 reverts back to decision block 510. If the $ESD_{Pwr\_Cap}$ is at least the first threshold as denoted by a "1", the flowchart proceeds to block 512 wherein the SOC adjustment mode is deactivated. In one embodiment, the flowchart 500 only proceeds to block 512 if the $ESD_{Pwr\_Cap}$ has achieved the first threshold for a second predetermined period of time. In a non-limiting embodiment, the second predetermined period of time is 6 seconds.

At block 512 the SOC activation mode is deactivated and the commanded SOC is decreased from the elevated SOC to the desired SOC while maintaining the $ESD_{Pwr\_Cap}$ at least the first threshold. Decreasing the commanded SOC from the elevated SOC to the desired SOC is illustrated with reference to the non-limiting plot 400 of FIG. 4. Due to the condition that warmer ESD temperatures are indicative of higher $ESD_{Pwr\_Cap}$ values at a given ESD SOC 125, the commanded SOC may be decreased at a predetermined rate based on a function of a rate at which the ESD temperature 127 is increasing.

It will be appreciated in one aspect of this disclosure, the age of the ESD 25 for performing autostart events of the engine can be increased. For instance, as the ESD 25 ages as indicated by the ESD internal resistance 129, the commanded SOC can be increased to affect an $ESD_{Pwr\_Cap}$ value that is capable (e.g., is at least the first threshold) of performing an autostart event. However, when the ESD internal resistance 129 is at least an internal resistance threshold and the elevated SOC is at least the maximum SOC limit of the ESD 25, an end-of-life condition of the ESD 25 can be determined. In a non-limiting embodiment, the internal resistance threshold is 35%.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for adjusting a state-of-charge (SOC) within an electrical energy storage device (ESD) of a hybrid powertrain system to improve an autostop availability of an engine mechanically coupled to an electric machine, comprising:
   monitoring a plurality of ESD parameters;
   determining a discharge power capability of the ESD based on the monitored ESD parameters;
   if the discharge power capability is less than a first threshold, activating a SOC adjustment mode comprising:
      increasing a commanded SOC to an elevated SOC to increase the discharge power capability; and
      maintaining the commanded SOC at the elevated SOC until the discharge power capability achieves the first threshold; and
   wherein the SOC adjustment mode is not activated unless both the discharge power capability is less than the first threshold and activation conditions exist for a predetermined period of time.

2. The method of claim 1, wherein determining the discharge power capability of the ESD based on the monitored ESD parameters comprises:
   determining the discharge power capability of the ESD based on a monitored SOC of the ESD as a function of an ESD temperature and an ESD internal resistance.

3. The method of claim 1, wherein the first threshold comprises a capability threshold that defines a minimum discharge power from the ESD required for performing an autostart event of the engine.

4. The method of claim 1, wherein the activation conditions exist when:
   an engine temperature is greater than an engine temperature threshold;
   an ESD temperature is greater than an ESD temperature threshold;
   the elevated SOC is not greater than a maximum SOC limit of the ESD;
   no voltage faults in the powertrain system exist;
   ambient temperature is greater than an ambient temperature threshold; and
   a transmission temperature is greater than a transmission temperature threshold.

5. The method of claim 1, wherein the activation conditions exist when:
   ESD power limits are not indicative of allowing an autostart of the engine;
   an engine temperature is less than an engine temperature threshold by a magnitude that does not exceed a disallowable threshold;
   an ESD temperature is greater than an ESD temperature threshold;
   the elevated SOC is not greater than a maximum SOC limit of the ESD;
   no voltage faults in the powertrain system exist;
   ambient temperature is greater than an ambient temperature threshold; and
   a transmission temperature is greater than a transmission temperature threshold.

6. The method of claim 1, wherein increasing the commanded SOC to the elevated SOC to increase the discharge power capability comprises:
increasing the commanded SOC from a desired SOC to the elevated SOC, the elevated SOC selected to produce an increased discharge power capability that is at least the first threshold.

7. The method of claim 6, wherein the elevated SOC selected to produce the increased discharge power capability is based on a function of an ESD temperature.

8. The method of claim 6, wherein the elevated SOC selected to produce the increased discharge power capability is based on a function of an ESD temperature and an ESD internal resistance.

9. The method of claim 1, wherein activating the SOC adjustment mode further comprises:
if the discharge power capability is less than a second threshold:
prior to increasing the commanded SOC to the elevated SOC, decreasing the commanded SOC to maximize an ability to absorb electrical energy within the ESD; and
increasing the commanded SOC to the elevated SOC when the discharge power capability is at least the second threshold, wherein the second threshold is less than the first threshold.

10. The method of claim 1, further comprising:
monitoring an ESD internal resistance;
comparing the ESD internal resistance to an internal resistance threshold;
comparing the elevated SOC to a maximum SOC limit of the ESD; and
when the ESD internal resistance is at least the internal resistance threshold and the elevated SOC is at least the maximum SOC limit, determining an end-of-life condition of the ESD.

11. The method of claim 1, further comprising:
deactivating the SOC adjustment mode when the discharge power capability has achieved the first threshold for a predetermined period of time.

12. The method of claim 11, wherein deactivating the SOC adjustment mode comprises:
decreasing the commanded SOC from the elevated SOC to a desired SOC while maintaining the discharge power capability at at least the first threshold.

13. The method of claim 12, wherein the commanded SOC is decreased at a predetermined rate based on a function of a rate at which an ESD temperature is increasing.

14. Method for adjusting a state-of-charge (SOC) within an electrical energy storage device (ESD) of a hybrid powertrain system to improve an autostart availability of an engine mechanically coupled to an electric machine, comprising:
monitoring an ESD temperature, an ESD internal resistance, and a SOC of the ESD;
estimating a discharge power capability of the ESD based the monitored SOC of the ESD as a function of the monitored ESD temperature and the monitored ESD internal resistance;
if the discharge power capability is less than a capability threshold for a first predetermined period of time, activating a SOC adjustment mode comprising:
increasing a commanded SOC to an elevated SOC to increase the discharge power capability, and
maintaining the commanded SOC at the elevated SOC until the discharge power capability achieves the capability threshold; and
deactivating the SOC adjustment mode when the discharge power capability has achieved the capability threshold for a second predetermined period of time.

15. The method of claim 14, wherein deactivating the SOC adjustment mode comprises:
decreasing the commanded SOC from the elevated SOC to a desired SOC while maintaining the discharge power capability at at least the capability threshold.

16. The method of claim 14, wherein the capability threshold defines a minimum discharge power from the ESD required for performing an autostart event of the engine.

17. The method of claim 14, wherein increasing the commanded SOC to the elevated SOC to increase the discharge power capability comprises:
increasing the commanded SOC from a desired SOC to the elevated SOC, the elevated SOC selected to produce an increased discharge power capability that is at least the capability threshold.

18. The method of claim 14, wherein the elevated SOC selected to produce the increased discharge power capability is based on a function of an ESD temperature.

19. The method of claim 14, wherein the elevated SOC selected to produce the increased discharge power capability is based on a function of an ESD temperature and an ESD internal resistance.

* * * * *